United States Patent [19]

Holtrop et al.

[11] Patent Number: 4,489,126

[45] Date of Patent: Dec. 18, 1984

[54] THERMOFORMABLE LAMINATE STRUCTURE

[75] Inventors: James S. Holtrop, South Windsor, Conn.; Richard P. Maurer, Wilbraham, Mass.

[73] Assignee: Monsanto Company, St. Louis, Mo.

[21] Appl. No.: 553,462

[22] Filed: Nov. 21, 1983

[51] Int. Cl.$^3$ .......................... B32B 5/18; B32B 5/28
[52] U.S. Cl. ...................................... 428/246; 156/78; 428/286; 428/296; 428/304.4; 428/319.7
[58] Field of Search .................. 156/77, 78; 428/246, 428/282, 286, 287, 288, 296, 304.4, 314.4, 314.8, 316.6, 317.1, 317.5, 317.7, 318.4, 319.3, 319.7

[56] References Cited

U.S. PATENT DOCUMENTS 3,303,086  2/1967  Demers ........................... 428/319.3
3,531,367  9/1970  Karsten ........................... 428/319.9
3,654,063  4/1972  Blackbarn et al. ............... 428/304.4
4,065,596 12/1977  Groody ............................. 428/246

FOREIGN PATENT DOCUMENTS 2906259  8/1980  Fed. Rep. of Germany ... 428/319.7

Primary Examiner—William J. Van Balen
Attorney, Agent, or Firm—Lawrence L. Limpus; Thomas E. Kelley

[57] ABSTRACT

A moisture-resistant, moldable, thermoformable laminate structure and method of making same is disclosed. The structure comprises a layer of a foamed thermoplastic material having first and second surfaces and a coating of acrylic resin, having a softening temperature greater than approximately 130° C., impregnated fabric bonded to said first and second surfaces.

11 Claims, No Drawings

THERMOFORMABLE LAMINATE STRUCTURE

This invention relates to thermoplastic materials, and particularly to a thermoformable laminate structure comprising foamed thermoplastic resins. More particularly this invention relates to a moisture-resistant, moldable, thermoformable laminate structure which may be molded into complex shapes. More particularly this invention relates to a thermoformable laminate structure having a coating formed from a fabric which is impregnated with an polymeric resin which has a high softening temperature.

DESCRIPTION OF THE PRIOR ART

Foamed thermoplastic laminates have been used for many years. These laminates were most often formed as a sandwich structure in which the foamed thermoplastic material was enclosed between liner board facings. An example of this construction is a polystyrene foam sheet which has a kraft liner board facing on each side. This laminate has been used by die-cutting and scoring or by pressing the board and applying a resin to fix the pressed shape. However, the kraft liner board facing is a paper material which is not easily molded and which has a tendency to wrinkle during any molding of the laminate structure.

Other efforts have been made to provide a laminate structure which may more easily be molded. A thermoplastic laminate has been formed of a layer of foamed styrene-maleic anhydride polymer to which a thermoplastic polymer skin is bonded. This laminate is moldable without the problems caused by the earlier developed paper facings.

More recent efforts have provided laminate structures formed of molded fiberglass which contains a phenol-formaldehyde polymer as a binder. A rayon scrim is attached to one side of a fiberglass batt and is compression molded to the desired shape.

SUMMARY OF THE INVENTION

It is an object of this invention to provide a moldable thermoformable laminate structure.

It is a further object of this invention to provide a moisture-resistant, moldable, thermoformable laminate structure formed from foamed thermoplastic resins which are faced by a resin impregnated fabric.

It is yet another object of this invention to provide a moisture-resistant, moldable, thermoformable laminate structure formed from a layer of foamed thermoplastic material which is faced by a fabric impregnated with an acrylic resin having a high softening temperature.

An additional object of this invention is to provide a method for fabricating the moisture-resistant, moldable, thermoformable laminate structure.

These and other objects are obtained by the thermoformable laminate structure of this invention and the method of fabrication described hereinafter.

The moisture-resistant, moldable, thermoformable laminate structure of this invention has a layer of a foamed thermoplastic material such as foamed polystyrene which has first and second surfaces. A resin impregnated fabric coating is bonded to the first and second surfaces of the layer of foamed thermoplastic material. It is preferred that the resin be an acrylic resin having a softening temperature greater than approximately 130° C.

This invention also includes the method for fabricating the laminate structure. The method includes preparing a layer of foamed thermoplastic material, such as polystyrene, having first and second surfaces, coating a fabric with a resin which is preferably an acrylic resin having a softening temperature greater than approximately 130° C., drying the resin impregnated fabric, bonding the dried resin impregnated fabric to both surfaces of the layer of foamed thermoplastic material to form a moldable, thermoformable laminate structure.

DESCRIPTION OF THE PREFERRED EMODIMENT

The moisture-resistant, moldable, thermoformable laminate structure of this invention has a layer of a foamed thermoplastic material which has first and second surfaces. The layer of thermoplastic material is preferably a layer of foamed polystyrene; however, other foamed thermoplastic materials such as foamed styrene-maleic anhydride polymer, foamed polyethylene and other similar materials may also be used. To form the laminate structure, a coating is bonded to the first and second surfaces of the foamed thermoplastic material. The coating is a resin impregnated fabric which is bonded to the surfaces. The fabric which provides support for the resin being applied to the surface of the thermoplastic layer may be a cloth fabric, a non-woven fabric or a non-woven, spunbonded fabric. The resin used to impregnate the fabric is preferably an acrylic resin having a high softening temperature, that is, a softening temperature greater than approximately 130° C. Other resins such as a phenolic resin may also be used. When a phenolic resin is used instead of the preferred acrylic resin the fabrication process must be modified to prevent a complete cure of the phenolic resin before the laminate structure is molded into the desired final shape. When the phenolic resin is completely cured it is no longer moldable; thus, during the preparation of the laminate structure, the phenolic resin impregnated fabric must be only partially cured. It must remain partially cured until the final molding step. The use of an acrylic resin, which is preferred, eliminates the handling problems such as storage to prevent curing and emission of volatile materials which are associated with the use of a phenolic resin. The coating is bonded to the surfaces of the layer of foamed thermoplastic material. This may be accomplished by heat treatment during the laminating or by an adhesive which is preferably water dispersed.

The moldable, thermoformable laminate structure of this invention is manufactured by producing a layer of foamed thermoplastic material having first and second surfaces, impregnating a fabric with a resin dispersed within a solvent, drying the resin impregnated fabric by heating it to a temperature between approximately 130° C. and approximately 180° C., and bonding the dried resin impregnated fabric to the first and second surfaces of the layer of foamed thermoplastic material with an adhesive to form a laminate structure. The addition of the resin impregnated fabrics to the surfaces of the layer of foamed thermoplastic material provides a laminate structure which is moisture-resistant and moldable.

The layer of thermoplastic material is preferably a sheet of foamed polystyrene. Other foamed thermoplastic materials such as foamed styrene-maleic anhydride polymer, foamed polyethylene and other similar materials may also be used. While there are no limits on the thickness of the layer of foamed thermoplastic material, the thickness is usually limited to that which is easily laminated. The thickness of the layer of thermoplastic material used in this invention, will generally be less than 30 millimeters and it is preferred that the thickness of the layer of foamed thermoplastic material be between approximately two millimeters and approximately twenty millimeters.

A resin impregnated fabric is bonded to the surfaces of the layer of foamed thermoplastic material. The fabric may be a woven cloth fabric, a non-woven fabric or a non-woven, spunbonded fabric. Satisfactory results have been achieved using a broadcloth of 50% polyester and 50% cotton and in using a nylon mesh. Equally satisfactory results have been achieved using non-woven, spunbonded polyester fabrics. The thickness of the resin impregnated fabric when applied to the layer of foamed thermoplastic resin is typically within the range of from approximately 0.1 millimeters to approximately 1.0 millimeters.

The resin used to impregnate the fabric is preferably an acrylic resin having a high softening temperature, that is, a softening temperature greater than approximately 130° C. It must be noted that this high softening temperature can be contrasted to the softening temperature for other comparable resins which is generally less than 100° C. An acrylic resin which has been found to be especially suitable for use in this invention is Joncryl-678, an acrylic resin made by Johnson Wax, a division of S. C. Johnson & Son, Inc. Joncryl-678 is a styrene-methacrylic acid copolymer which is water soluble. It is not required that the acrylic resin used in this invention be water soluble as satisfactory results have also been achieved using methanol soluble acrylic resins. It is also possible to use resins other than acrylic resins such as phenolic resins.

The following examples illustrate the laminate structures made in accordance with this invention.

EXAMPLE I

Pieces of a woven broadcloth containing 50% polyester and 50% cotton were impregnated with a phenolic liquid resin which contained 50% solids dispersed in water. The resin impregnated fabric was then dried in an oven. The dried resin impregnated cloth was adhesively bonded to both surfaces of a polystyrene foam sheet with a water based adhesive. The resulting laminate was thermoformed.

EXAMPLE II

A sheet of polystyrene foam was covered by a nylon mesh and was then coated by an acrylic resin dissolved in water. The nylon mesh provides a substrate for the acrylic resin coating while adding strength and flexibility to the laminate structure. The laminate was oven dried at approximately 80° C. following the addition of the acrylic resin.

A coating such as this, a nylon mesh which is adhered to the surface of a structure by an acrylic coating, can be applied to other brittle foams such as phenolic foams, to provide strength and rigidity. It is also possible to use coatings other than the acrylic resin, such as polyester, melamine and phenolic materials.

EXAMPLE III

A non-woven, spunbonded polyester fabric was impregnated with a phenolic liquid resin dispersed in water which contained approximately 50% solids. The resin impregnated polyester fabric was dried in an oven. The resinated fabric was then adhesively bonded to a sheet of foamed polystyrene with a water based adhesive and the resulting laminate structure was thermoformed.

EXAMPLE IV

Pieces of non-woven, spunbonded polyester were impregnated with an acrylic resin dissolved in methanol and dried in an oven at a temperature of between approximately 130° C. and approximately 160° C. The resinated fabric was adhesively bonded to both surfaces of a sheet of foamed polystyrene with a water based adhesive.

EXAMPLE V

Pieces of non-woven, spunbonded polyester were impregnated with an acrylic resin dissolved in water and dried in an oven at a temperature of between approximately 130° C. and approximately 160° C. The resinated fabric was adhesively bonded to both surfaces of a sheet of foamed polystyrene with a water based adhesive.

As will be apparent to those skilled in the art the inventive concept set forth herein can find many applications in the art of moldable, thermoformable laminate structures and many variations on and modifications to the embodiments described above may be made without departure from the spirit and scope of this invention.

We claim:

1. A moisture-resistant, moldable, thermoformable laminate structure comprising:
    (a) a layer of a foamed thermoplastic material, said layer having first and second surfaces; and
    (b) a coating bonded to said first and second surfaces; said coating being a resin impregnated fabric; said resin being an acrylic resin having a softening temperature greater than approximately 130° C.

2. The laminate structure of claim 1 wherein the layer of foamed thermoplastic material is selected from a group consisting of foamed polystyrene, foamed styrene-maleic anhydride polymer and foamed polyethylene.

3. The laminate structure of claim 1 wherein the layer of foamed thermoplastic material is a foamed polystyrene.

4. The laminate structure of claim 1 wherein said fabric is a non-woven material.

5. The laminate structure of claim 1 wherein said fabric is a woven cloth fabric.

6. The laminate structure of claim 1 wherein said fabric is a non-woven, spunbonded fabric.

7. The laminate structure of claim 1 wherein said acrylic resin is styrene-methacrylic acid copolymer.

8. A method of fabricating a moisture-resistant, moldable, thermoformable laminate structure comprising:
    (a) producing a layer of foamed thermoplastic material having first and second surfaces;
    (b) impregnating fabric with an acrylic resin dissolved within a solvent, the resin having a softening temperature greater than 130° C.;
    (c) drying the resin impregnated fabric; and
    (d) bonding the resin impregnated fabric to the thermoplastic material to form a laminate structure.

9. The method of claim 8 wherein resin impregnated fabric is adhesively bonded to the first and second surfaces of the layer of foamed thermoplastic material.

10. The method of claim 8 wherein said resin impregnated fabric is heated to a temperature between approximately 130° C. and approximately 180° C. to remove the solvents from the acrylic resin.

11. The method of claim 8 wherein the acrylic resin is a styrene-methacrylic acid copolymer.

* * * * *